United States Patent
Ogawa

(10) Patent No.: US 7,006,290 B2
(45) Date of Patent: Feb. 28, 2006

(54) OPTICAL SYSTEM AND METHOD OF DESIGNING OPTICAL SYSTEM

(75) Inventor: Hideki Ogawa, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/992,733

(22) Filed: Nov. 22, 2004

(65) Prior Publication Data

US 2005/0117221 A1   Jun. 2, 2005

(30) Foreign Application Priority Data

Dec. 1, 2003   (JP) .............................. 2003-401730

(51) Int. Cl.
*G02B 27/44* (2006.01)

(52) U.S. Cl. ...................... 359/565; 359/569; 359/574; 359/743

(58) Field of Classification Search ................ 359/565, 359/569
See application file for complete search history.

(56) References Cited

U.S. PATENT DOCUMENTS

| | | |
|---|---|---|
| 5,044,706 A | 9/1991 | Chen |
| 5,528,427 A | 6/1996 | Tanaka et al. |
| 5,537,259 A | 7/1996 | Ogawa |
| 5,568,321 A | 10/1996 | Ogawa et al. |
| 5,790,321 A * | 8/1998 | Goto ........................... 359/742 |
| 5,930,043 A | 7/1999 | Ogawa |
| 6,124,981 A | 9/2000 | Ogawa |
| 2005/0088756 A1* | 4/2005 | Yamada ....................... 359/687 |
| 2005/0128599 A1* | 6/2005 | Ogawa ........................ 359/642 |

FOREIGN PATENT DOCUMENTS

| | | |
|---|---|---|
| JP | 4-213421 | 8/1992 |
| JP | 6-324262 | 11/1994 |

* cited by examiner

*Primary Examiner*—Fayez G. Assaf
(74) *Attorney, Agent, or Firm*—Fitzpatrick, Cella, Harper & Scinto

(57) ABSTRACT

An optical system includes a diffractive optical element and a refractive optical element. The diffractive optical element corrects a chromatic aberration flare component of wavelengths other than a predetermined wavelength (a design wavelength) remaining in the refractive optical element by means of an aspherical component given by the grating pitch of a diffraction grating included in a diffractive portion of the diffractive optical element. In addition, a refractive portion of the diffractive optical element is adapted to correct an aberration component as a composite of the aberration component of the design standard wavelength shifted by the correction and the aberration component of the design standard wavelength of the refractive optical element.

5 Claims, 8 Drawing Sheets

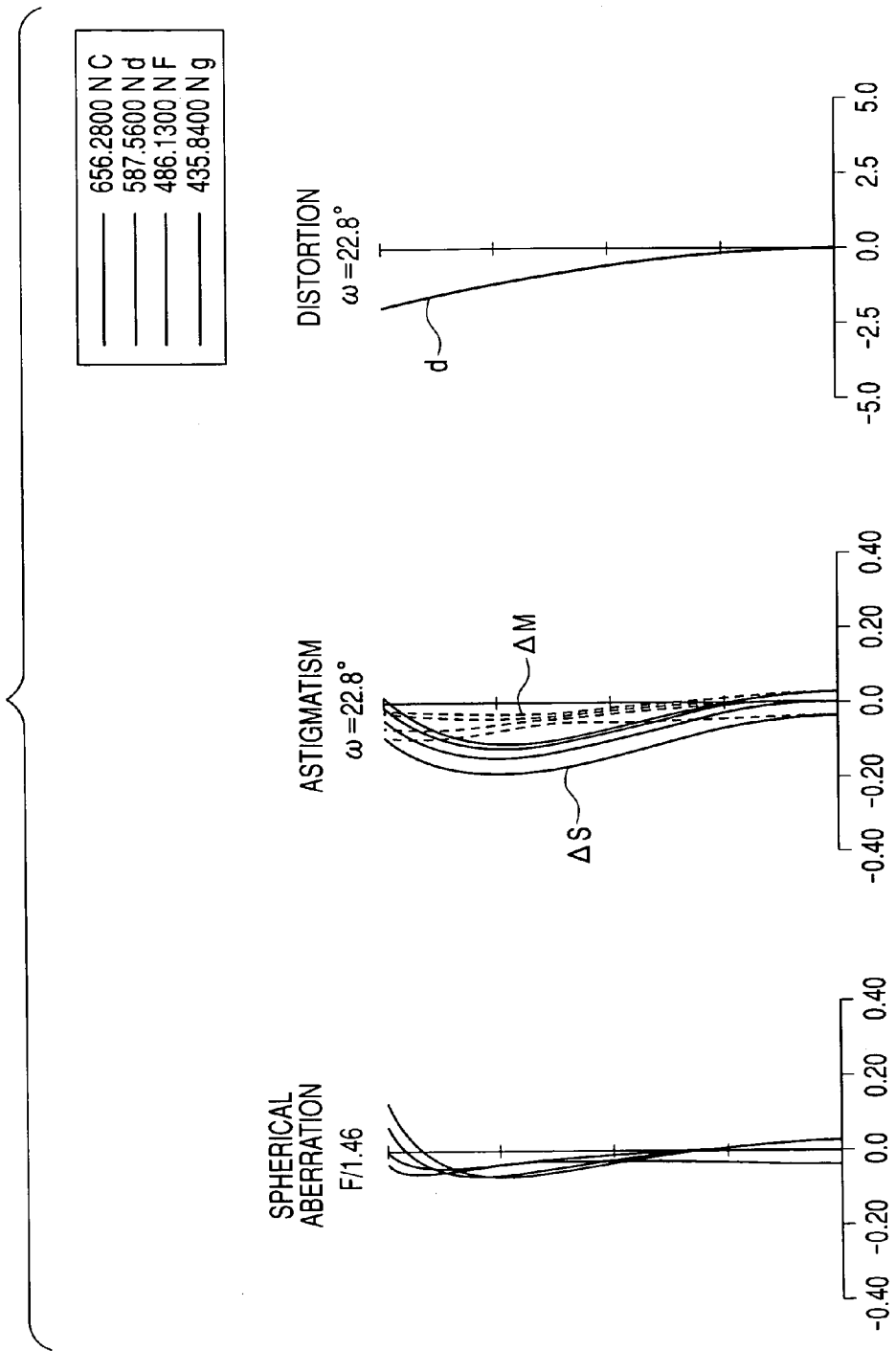

OPTICAL SYSTEM AND METHOD OF DESIGNING OPTICAL SYSTEM

BACKGROUND OF THE INVENTION

1. Field of the Invention

The present invention relates to an optical system and a method of designing the optical system. More particularly, the present invention relates to an optical system and a method for designing the optical system in which chromatic aberration is favorably corrected by means of a combination of a diffractive optical element and a refractive optical element to easily achieve excellent optical performance. The present invention is suitably applied to optical apparatuses such as silver-halide film cameras, video cameras, electronic still cameras and digital cameras.

2. Related Background Art

As a method of correcting chromatic aberration of an optical system, there is a conventional method in which two glass materials (or lenses) with different dispersions are used in combination.

Besides this conventional method of reducing chromatic aberration by means of the combination of glass materials, there is a known method in which chromatic aberration is reduced by provision of a diffractive optical element(s) having a diffracting function on a lens surface or as a part of the optical system (see, for example, Japanese Patent Application Laid-Open No. H04-213421 (a counterpart of U.S. Pat. No. 5,044,706) and Japanese Patent Application Laid-Open No. H06-324262 (a counterpart of U.S. Pat. No. 5,790,321)).

This method utilizes the physical phenomenon that chromatic aberration with respect to rays of a certain standard wavelength is generated in the opposite directions between a refractive surface and a diffractive surface in an optical system. In addition, it is possible to allot an effect similar to that of an aspherical lens to such a diffractive optical element by changing the period of its periodic structure. This is very effective in reducing aberrations.

Since diffractive optical elements have a strong achromatizing effect and an effect similar to that of an aspherical surface, various optical systems in which a combination of a diffractive optical element(s) and a refractive optical element(s) are used for achromatization have been proposed. However, it has not been achieved to correct spherical aberration at a design standard wavelength and a color flare component such as chromatic spherical aberration excellently, while correcting longitudinal chromatic aberration and chromatic aberration of magnification.

SUMMARY OF THE INVENTION

An object of the present invention is to provide an optical system with high performance and a method of designing the same that enables correction of longitudinal chromatic aberration and chromatic aberration of magnification and also enables excellent correction of a color flare component such as chromatic spherical aberration and spherical aberration at a design standard wavelength.

An exemplary optical system according to the present invention includes a diffractive optical element and a refractive optical element. The diffractive optical element is adapted to correct a chromatic aberration flare component of wavelengths other than a predetermined wavelength (the design wavelength) remaining in the refractive optical element by means of an aspherical component given by the grating pitch of a diffraction grating included in a diffractive portion of the diffractive optical element. In addition, a refractive portion of the diffractive optical element is characterized in that it corrects an aberration component as a composite of the aberration component of the design wavelength of the diffraction optical element shifted by the correction and the aberration component of the design wavelength of the refractive optical element.

An exemplary method of designing an optical system having a diffractive optical element and a refractive optical element according to the present invention comprises a first process to correct a chromatic aberration flare component of wavelengths other than the design wavelength remaining in the refractive optical element of the optical system by means of an aspherical component given by the grating pitch of a diffraction grating of the diffractive optical element and a second process to correct an aberration component as a composite of the aberration component of the design wavelength shifted by the correction in the first process and the aberration component of the design wavelength of the refractive optical element by means of a refractive portion of the diffractive optical element.

BRIEF DESCRIPTION OF THE DRAWINGS

FIG. 11 shows aberrations of the optical system in which the aberrations are recorrected after removing an aspherical surface from the optical system in which the aberrations has been once corrected by means of the diffractive optical element according to the first embodiment (in the state focused on infinity).

DETAILED DESCRIPTION OF THE PREFERRED EMBODIMENTS

Figure 1:
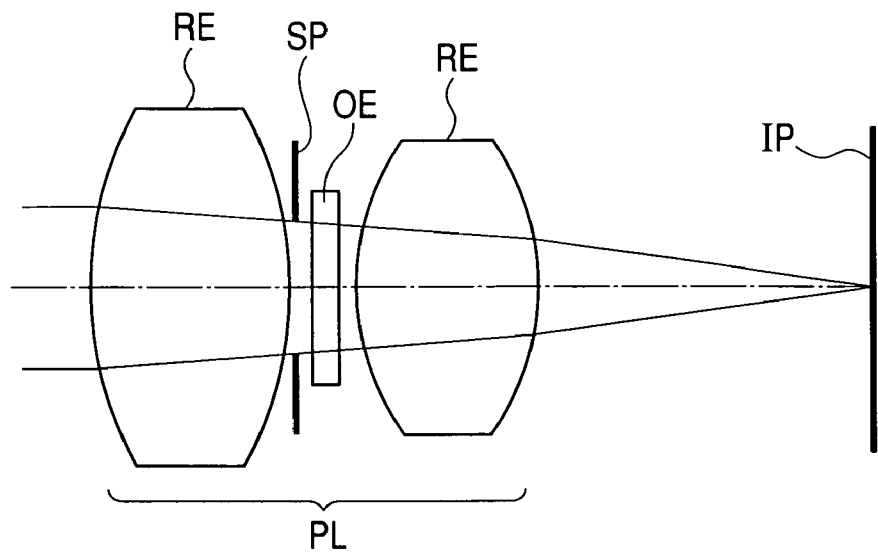
FIG. 1 is a cross sectional view of the lenses of an optical system according to the present invention.

FIG. 1 is a diagram schematically showing an optical system using a diffractive optical element according to the present invention in cross-sectional view as applied to a photographing optical system of, for example, a digital camera, a video camera or a film camera. In FIG. 1, PL designates a photographing lens, which includes a refractive optical element RE, an aperture stop SP and a diffractive optical element OE. IP indicates the imaging plane, on which a solid-state image pickup element such as a CCD or a CMOS sensor, or a silver-halide film is to be disposed. Although a flat plate in the vicinity of the stop SP is designed to be a diffractive optical element OE in the arrangement shown in FIG. 1, this feature is not restrictive. A diffractive optical element may be provided on a lens surface or a plurality of diffractive optical elements may be employed in a photographing lens.

Next, embodiments of the diffractive optical element OE that can be applied to the arrangement shown in FIG. 1 will be described with reference to the drawings.

Figure 2:
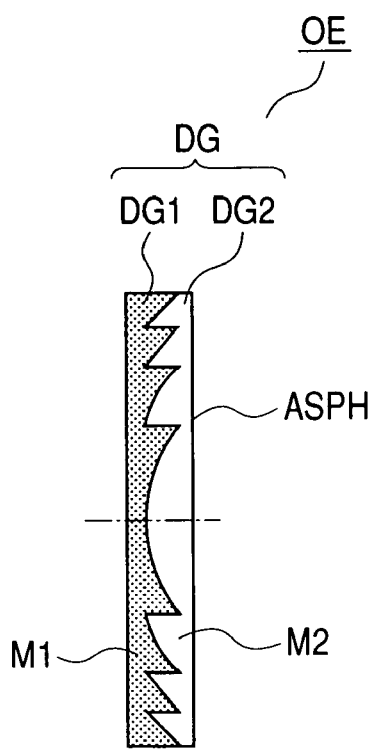
FIG. 2 is a cross sectional view showing the principal portion of the diffractive optical element of a first embodiment according to the present invention.

FIG. 2 is a cross sectional view showing the principal part of a diffractive optical element OE according to the first embodiment of the present invention. The diffractive optical element OE of the first embodiment includes a diffractive optical portion DG having a closely-contacting two-layer structure, in which diffraction gratings DG1 and DG2 are formed at the interface of two different materials M1 and M2. Grating material M1 is a material having a low refractive index and high dispersion and grating material M2 is a material having a high refractive index and low dispersion, so that a high diffraction efficiency is achieved in the visible light range. Particularly, it is preferable that grating material M1 has an Abbe number smaller than or equal to 20 and a refractive index smaller than or equal to 1.6. With this feature, excellent diffraction efficiency can be realized. Although an aspherical surface ASPH is provided on the non-grating surface of grating material M2, it may be provided on the non-grating surface of grating material M1 or the non-grating surfaces of both the materials.

The diffractive optical element OE of this embodiment corrects chromatic aberration remaining in the refractive optical system portion of the optical system by means of an aspherical term of the diffractive optical element OE, and spherical aberration as a composite of the spherical aberration shifted by the aforementioned correction and the remaining spherical aberration of the refractive optical system portion is corrected by the aspherical surface ASPH.

Figure 3:
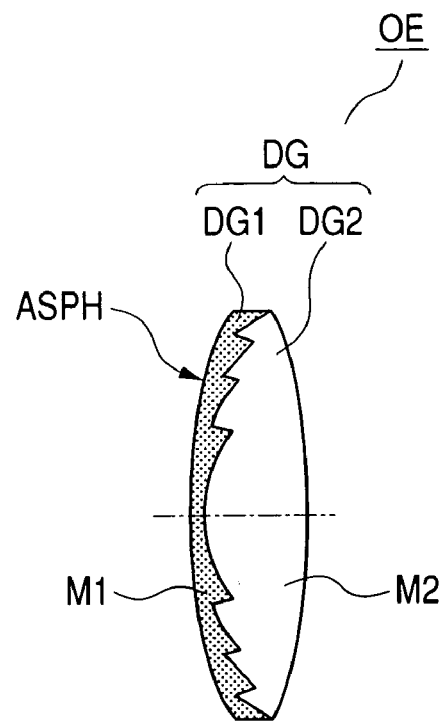
FIG. 3 is a cross sectional view showing the principal portion of the diffractive optical element of a second embodiment according to the present invention.

FIG. 3 is a cross sectional view showing the principal part of a diffractive optical element OE according to the second embodiment of the present invention. In contrast to the first embodiment shown in FIG. 2, the diffractive optical element OE of the second embodiment includes a diffractive optical portion DG having a closely-contacting two-layer structure, in which diffraction gratings DG1 and DG2 are formed at the curved interface of two different materials M1 and M2. In addition, the non-grating surface of grating material M1 is designed to be an aspherical surface ASPH. Although the non-grating surface of grating material M2 is a spherical surface, it may be an aspherical surface. The materials used in the second embodiment are the same as those in the first embodiment.

Figure 4:
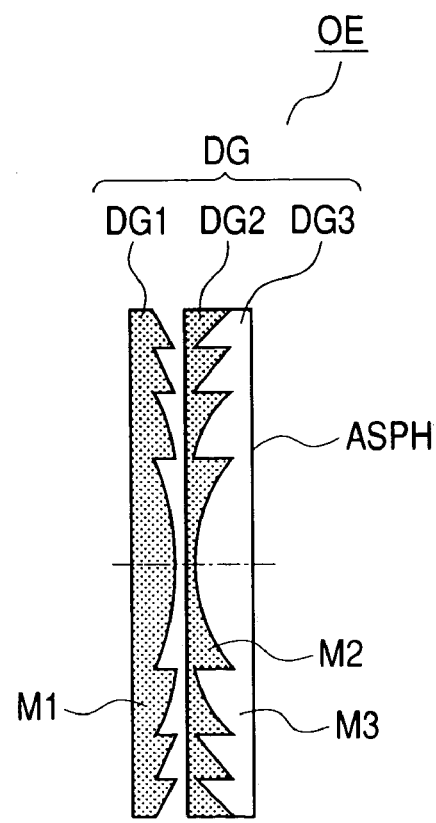
FIG. 4 is a cross sectional view showing the principal portion of the diffractive optical element of a third embodiment according to the present invention.

FIG. 4 is a cross sectional view showing the principal part of a diffractive optical element OE according to the third embodiment of the present invention. The diffractive optical element OE according to the third embodiment has a diffractive optical portion DG having a three-layer structure including a diffraction grating portion having a closely-contacting two-layer structure, in which diffraction gratings DG2 and DG3 are formed at the interface of two different materials M2 and M3, and a single layer diffraction grating DG1 that are disposed adjacent to each other. Materials M1 and M2 are low dispersion materials and material M3 is a high dispersion material, so that a high diffraction efficiency is achieved in the visible light range. Particularly, it is preferable that material M2 have an Abbe number smaller than or equal to 25. With this feature, favorable diffraction efficiency can be realized. Although an aspherical surface ASPH is provided on the non-grating surface of grating material M2, it may be provided on the non-grating surface of grating material M1 or M3 or it may be provided on all the non-grating surfaces.

Figure 5:
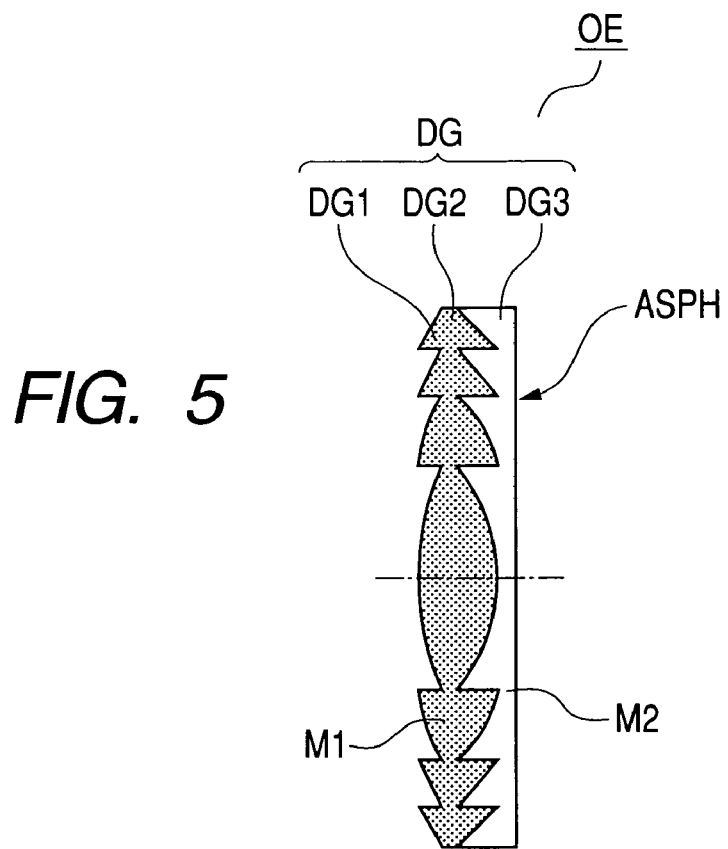
FIG. 5 is a cross sectional view showing the principal portion of the diffractive optical element of a fourth embodiment according to the present invention.

FIG. 5 is a cross sectional view showing the principal part of a diffractive optical element OE according to the fourth embodiment of the present invention. In the diffractive optical element OE of the fourth embodiment, diffraction gratings DG2 and DG3 are formed at the interface of two different materials M1 and M2 and a diffraction grating DG1 is formed on the surface of material M1 opposite, along the optical axis, to the aforementioned interface to constitute a diffractive optical portion DG. Grating material M1 is a material having low dispersion and grating material M2 is a material having high dispersion, so that high diffraction efficiency is achieved in the visible light range. Particularly, it is preferable that material M2 have an Abbe number smaller than or equal to 25. With this feature, excellent diffraction efficiency can be realized. An aspherical surface ASPH is provided on the non-grating surface of material M2.

The diffractive optical elements employed in the first to fourth embodiments are such diffractive optical elements that are designed to achieve high diffraction efficiency for a diffracted light of a predetermined order (a designed order) over a wide wavelength range (in visible wavelength range). For this purpose, the diffraction gratings are shaped into blazed profile and the thickness of the diffraction gratings and the materials of the diffraction gratings (in terms of their dispersion and refractive index) are selected appropriately so that the maximum optical path length difference of the diffractive optical portion becomes an integral multiple (or the designed order multiple) of a plurality of wavelengths.

In the optical system in which the diffractive optical element OE according to the embodiment is implemented, a chromatic aberration flare component of wavelengths other than the design wavelength (or the predetermined wavelength) remaining in the refractive optical element portion RE is corrected by an aspherical component given by the grating pitch of the diffraction gratings DG1 to DG3 of the diffractive optical element OE.

Through the aspherical surface of the refractive portion (the non-grating surface) of the diffractive optical element OE, an aberration component in the form of a composite of the aberration component for the design wavelength of the diffractive optical element OE shifted by the aforementioned correction and the aberration component for the design wavelength of the refractive optical element RE is corrected.

In connection with this, two processes are employed in designing an optical system like one described above. The first process is to correct the chromatic aberration flare component of wavelengths other than the design wavelength remaining in the refractive optical element by means of an aspherical component given by the grating pitch of the diffraction grating of the diffractive optical element OE, and the second process is to correct an aberration component as a composite of the aberration component of the design wavelength shifted by the correction of the first process and the aberration component of the design wavelength of the refractive optical element by means of the non-grating portion (or the refractive portion) of the diffractive optical element.

In the following, an optical effect of the diffractive optical element according to the present invention will be described.

It is well known that in the case that a lens effect is assigned to a diffractive optical element, behavior of change in the imaging position along the optical axis depending on the wavelength of light is reverse to that of a refractive lens (or a refractive optical element) having same focal length as that of the diffraction optical element. This means that the Abbe number of the diffractive optical portion is negative. In addition, the absolute value of its Abbe number is 3.45, which indicates extremely high dispersion. This Abbe number is smaller than that of normal optical materials by one order of magnitude, and this is the principal cause of significant effects in correcting various aberrations represented by chromatic aberration such as longitudinal chromatic aberration and chromatic aberration of magnification. The reason for the above fact will be described in the following.

Letting $\Delta P$ be the change in the optical power (the optical power is the reciprocal of the focal length) of a refractive optical surface or a diffractive optical surface (diffractive optical portion) and $\nu$ be its Abbe number, a change in the chromatic aberration (or the aberration coefficient) $\Delta L$ can be represented by the following formula:

$$\Delta L \propto \Delta P / \nu \qquad (1).$$

In connection with this, since the Abbe number $\nu$ of existing optical materials is in the range of 25 to 70 at widest, the change in the optical power required for obtaining necessary chromatic aberration in the case of the diffractive optical element is $1/7$ to $1/20$ of that in the case of the refractive lens surface.

This means that, from the view point of the aberration theory, chromatic aberration such as longitudinal chromatic aberration and chromatic aberration of magnification can be controlled without inviting adverse effects on spherical aberration and coma and the like.

Next, the aspherical effect of the diffractive optical element will be described. The aspherical effect is another typical characteristic of the diffraction grating.

As is well known, the diffraction angle of a diffraction grating is proportional to the wavelength of the incident light and inversely proportional to the grating pitch. Consequently, it is possible to achieve an effect similar to an aspherical surface of a refractive lens in the vicinity of the design standard wavelength by varying the grating pitch of each annular band that is determined by the optical power of the diffraction grating. More specifically, in the case of the diffractive optical element, when the grating pitch is varied with the purpose of correcting, for example, the spherical aberration of the design wavelength, the local optical power variation $\Delta PL$ of the diffraction grating caused by the variation in the grating pitch becomes larger than the optical power variation $\Delta P$, which is given by formula (1), for correcting longitudinal chromatic aberration, by approximately one order of magnitude. This will result in a significant deterioration in color flare $\Delta$ such as chromatic, spherical aberration. For the above reasons, the effect similar to an aspherical surface of a refractive lens can be achieved only in a limited wavelength range in the neighborhood of the design wavelength that does not involves generation of significant color flare $\Delta$.

Figure 6:
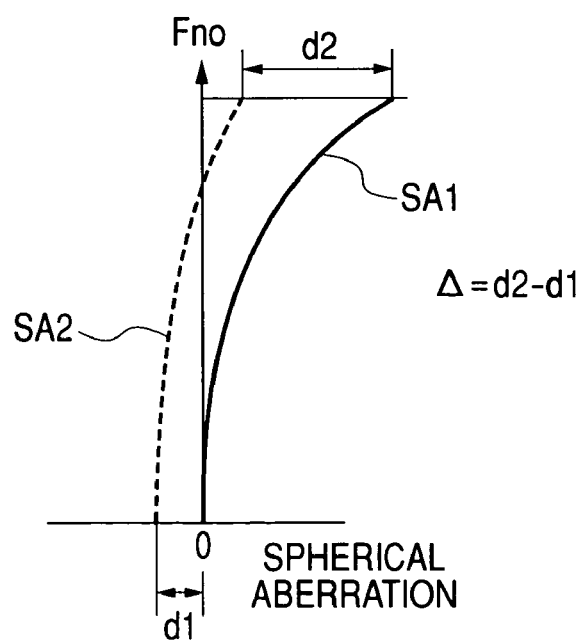
FIG. 6 is a diagram for illustrating color flare.

FIG. 6 is a diagram illustrating the color flare. It is assumed that when the optical power of the diffraction grating is varied, spherical aberration changes from SA1 to SA2. In this case, the color flare $\Delta$ at F-Number Fno is equal to "d2−d1" ($\Delta$=d2−d1).

This means that in order to solve this problem to attain high optical performance, it is necessary to provide a novel grating structure in which, for instance regarding to spherical aberration, both a spherical aberration component of the design wavelength and a chromatic spherical aberration component with respect to that standard are provided together.

Specifically, the required structure is such a structure in which chromatic spherical aberration remaining in the refractive optical element portion of the optical system in which the diffractive optical element is implemented is corrected by an aspherical term (a phase factor C2 or higher factors) of the diffractive optical element and spherical aberration as a composite of the spherical aberration shifted by the aforementioned correction and the remaining spherical aberration of the refractive optical element portion can be corrected by a spherical or aspherical surface other than the diffraction grating.

In the optical system according to the present invention, in order to realize the above-described structure, a refractive aspherical surface is efficiently introduced in the diffractive optical element and an effective condition therefor is appropriately determined.

It is preferable that the diffractive optical portion of the diffractive optical element in which the aspherical surface is introduced be a stack type diffractive optical portion composed of a plurality of diffraction gratings having a rotationally symmetrical shape with respect to the optical axis arranged in close contact with or closely to one another along the optical axis. With this diffractive optical portion, generation of parasitic diffraction color flare by the diffraction grating other than chromatic aberration flare can be suppressed. In addition, the stack structure has an advantage that a lens surface with no diffraction grating on which an aspherical surface is to be arranged can be easily provided. Furthermore, since it is adjacent to the diffraction grating on the optical axis, there is another advantage that the aberration component of the design wavelength changed in accordance with the correction of the aspherical component given by the grating pitch of the diffraction grating can be easily controlled in a direct manner.

It is preferable that the diffraction optical portion have the above-described structure and have a shape that satisfies conditional expression (2) presented bellow. With this feature, a diffraction optical element with improved performance can be obtained.

$$|(\lambda 0/2\pi) \cdot (\phi(Y) - \phi 0(Y))| < |(N' - N) \cdot (X(Y) - X0(Y))|,$$

$$\text{and } Y \neq 0 \qquad (2)$$

where, $\phi(Y)$: phase shape of the diffractive optical portion represented by the following polynomial expression:

$$\phi(Y) = (2\pi/\lambda 0)(C_1 Y^2 + C_2 Y^4 + C_3 Y^6 + \ldots),$$

φ0(Y): phase shape corresponding to the optical power given by the diffractive optical portion represented by the following formula:

$$\phi 0\ (Y) = (2\pi/\lambda 0) C_1 Y^2,$$

Y: height along a direction perpendicular to the optical axis,

λ0: design wavelength,

Ck: phase factor given by the diffraction grating (k=1, 2, 3, . . . ),

X(Y): aspherical shape provided in the non-grating portion of the diffractive optical element, representing the shift amount in the optical axis direction with the reference at the vertex on the optical axis, at height Y along a direction perpendicular to the optical axis, X0(Y): spherical shape having a curvature equal to the paraxial curvature of the aspherical surface provided in the non-grating portion of the diffractive optical element, representing the shift amount in the optical axis direction with the reference at the vertex on the optical axis, at height Y that is measured along a direction perpendicular to the optical axis, N': the refractive index of the medium just after (with respect to the traveling direction of rays) the aspherical surface provided in the diffraction. optical element at the design wavelength, N: the refractive index of the medium just before (with respect to the traveling direction of rays) the aspherical surface provided in the diffraction optical element at the design wavelength.

In the following, the technical meaning of conditional expression (2) will be described.

Conditional expression (2) relates to the aspherical component of the phase shape given by the diffractive optical portion of the diffractive optical element OE and the aspherical shift component in the optical axis direction of the refractive aspherical surface provided in the non-grating portion of the diffractive optical element OE taking into account the difference in the refractive index (N'−N) of mediums between before and after the refractive aspherical surface. This conditional expression (2) is mainly used for favorably balancing the chromatic aberration flare and aberrations at the design wavelength. If conditional expression (2) is not satisfied, the chromatic aberration flare and the aberrations at the design wavelength will be out of balance and image quality will be deteriorated, which is undesirable.

A method of manufacturing the diffractive optical element OE used in the present invention may be press molding of glass melted at high temperatures using a metal mold or the like, press molding of a UV-curing plastic resin etc. on the surface of a glass plate or the like using a mold and curing it with UV radiation, or molding of a plastic resin using a mold together with a lens. Furthermore, a process of cutting a glass directly to form a diffraction grating or a process of forming a fine step-like grating on $SiO_2$ or the like by wet-etching or dry-etching may also be employed.

Furthermore, it is preferable that a stack-type diffraction grating be formed by the method that will be described in the following. With that method, it is possible to provide an optical system that is favorable in terms of both correction of chromatic aberration and improvement in the diffraction efficiency.

One of the objects of introducing a diffractive optical element into an optical system is to cancel mainly chromatic aberrations generated at refractive optical elements by means of the diffractive optical portion.

Therefore, in the case that the diffractive optical portion is provided on a lens surface, the lens on which the diffractive optical portion is provided is allotted with a part of chromatic aberration that is required for the lens as the refractive optical element in connection with allotment of chromatic aberration to it and diffractive optical portion. Consequently, it is difficult to arbitrarily select the material of the lens on which the diffractive optical portion is provided.

Accordingly, as a process of forming the diffraction optical portion on a lens surface, in the case of the press molding of a glass melted at high temperatures using a metal mold or the like with a lens or molding of a plastic material with a lens, it is difficult to improve both chromatic aberration and wavelength dependency of the diffraction efficiency of the stack-type diffraction grating, since the lens and the diffraction grating are made of the same material and there is few freedom in selecting the grating material.

If a process that allows independent determination of the material of the lens and the material of the diffraction grating, such as a molding process using a UV curing plastic resin, is employed, it is possible to obtain an optical system that is favorable in terms of both correction of chromatic aberration and improvement in the diffraction efficiency. Therefore, such a forming process is preferable.

Although a diffraction optical element may be provided in any position in an optical system, excellent optical performance can be achieved if, for example, the diffractive optical element is provided at such a position that makes the passing position of paraxial rays and pupil paraxial rays from the optical axis as high as possible.

As per the above, in this embodiment, a high performance optical system with a small color flare component and a high resolution is realized by using an optical system including a diffractive optical element. In addition, since the diffractive optical element according to the present invention can be produced by a simple process, optical systems that allows a relatively high productivity can be realized.

Although diffractive optical elements that are applicable to a photographing optical system of a camera have been described as the embodiments, the invention is not limited to them. The present invention is also advantageous when applied to an optical system of an image scanner of a business machine, a reader lens of a digital copying machine or an exposure apparatus for manufacturing semiconductor devices etc.

Next, specific numerical embodiments of the optical system of the present invention together with cross sectional views of the lenses and aberration diagrams will be presented.

Figure 7:
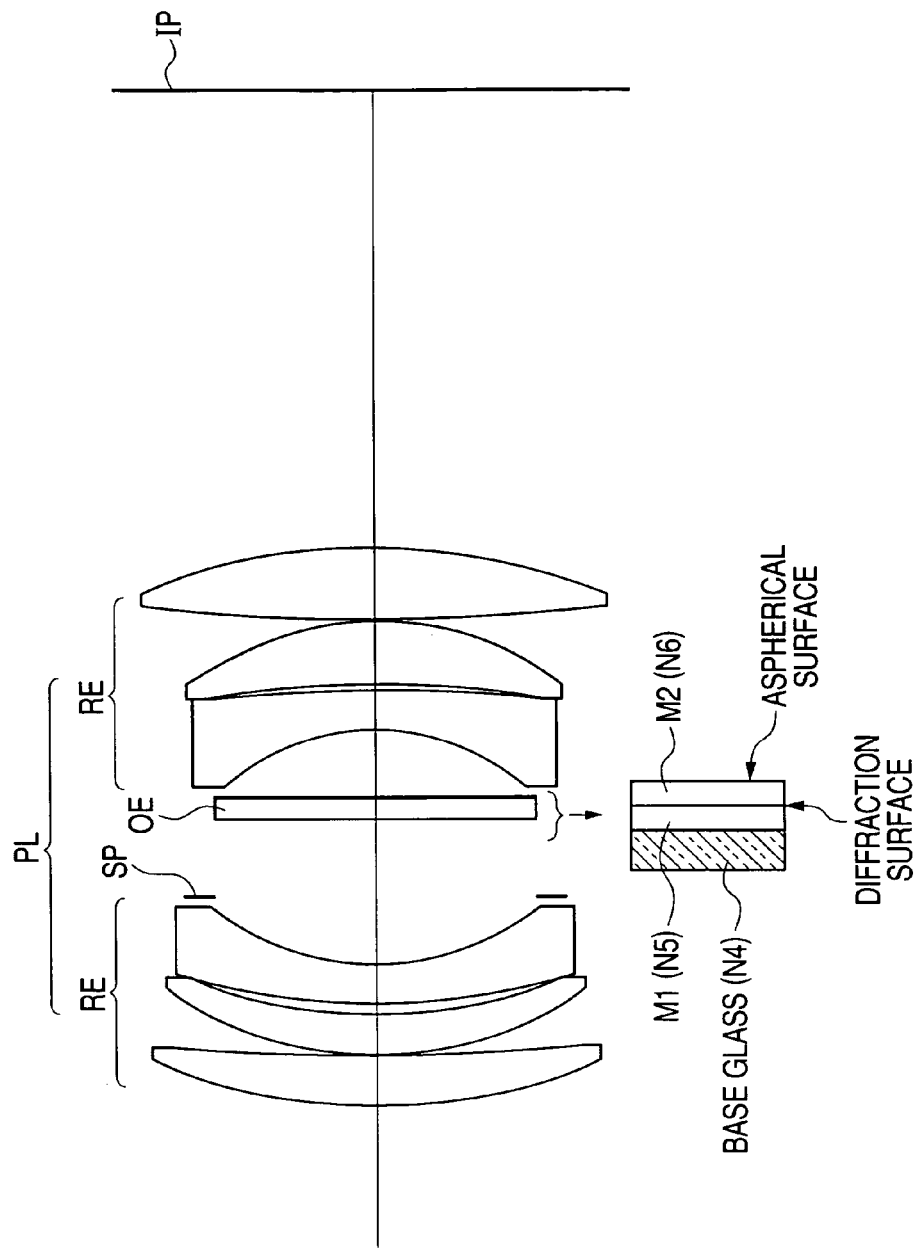
FIG. 7 is a cross sectional view showing an optical system in which the diffractive optical element according to the first embodiment of the present invention is used to correct aberrations.

FIG. 7 is a cross sectional view of the lens of an optical system in which the diffractive optical element according to numerical embodiment 1 that corresponds to the first embodiment is used to correct aberrations.

Figure 8:
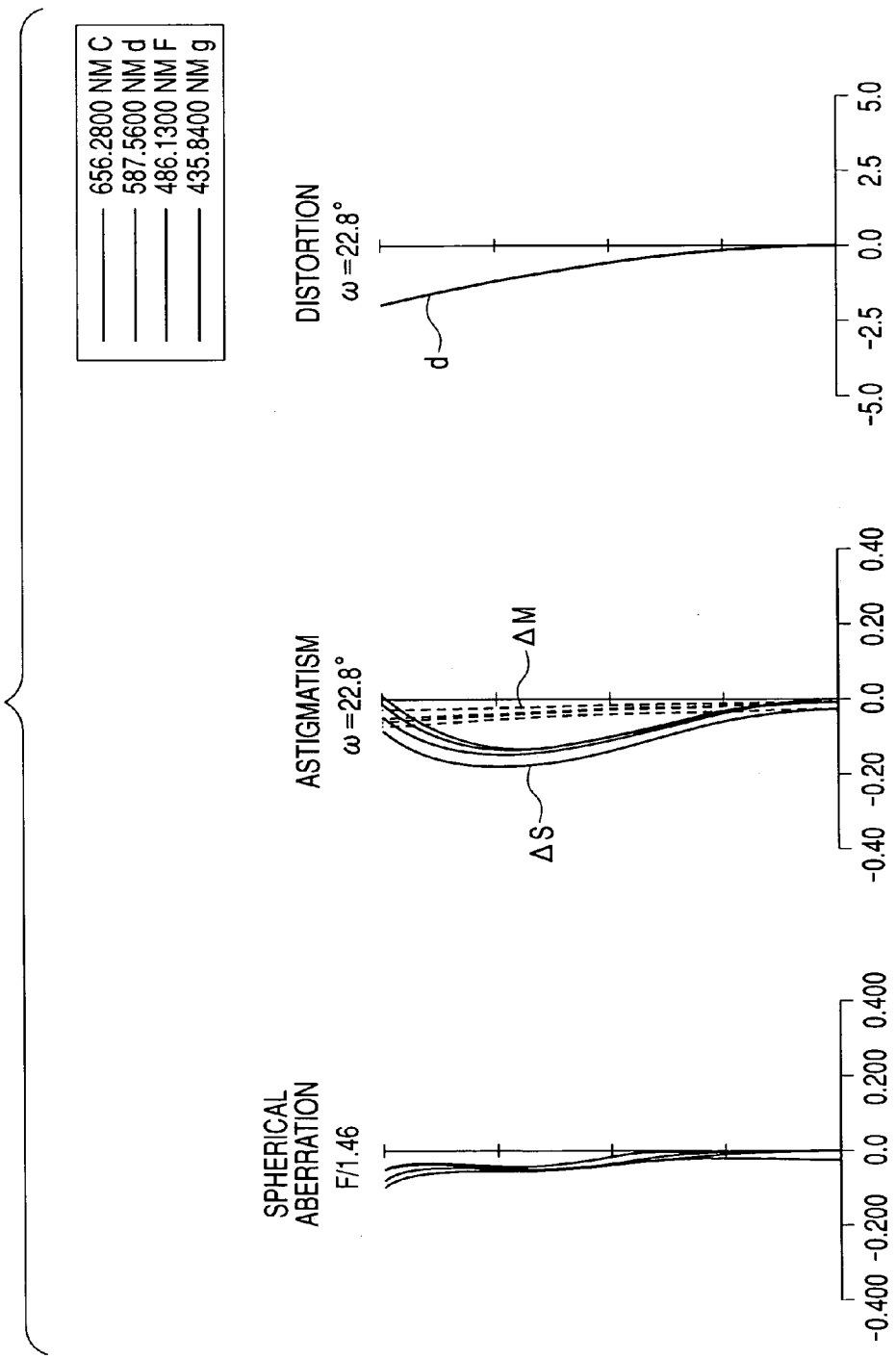
FIG. 8 shows aberrations of the optical system in which the diffractive optical element according to the first embodiment of the present invention is used to correct aberrations (in the state focused on infinity).
Figure 9:
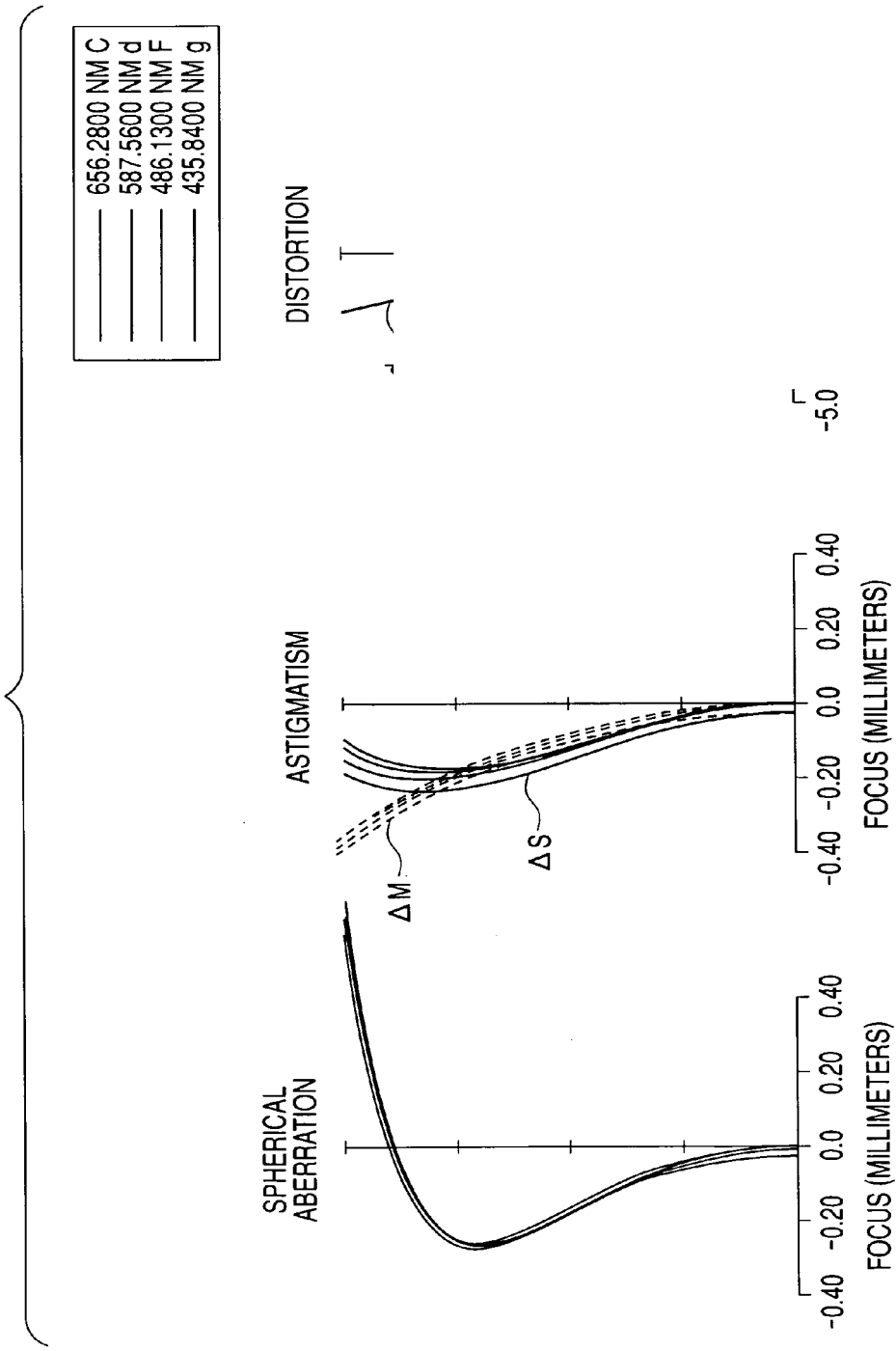
FIG. 9 shows aberrations of an optical system obtained by removing an aspherical surface from the optical system in which the diffractive optical element according to the first embodiment of the present invention is used to correct aberrations (in the state focused on infinity).
Figure 10:
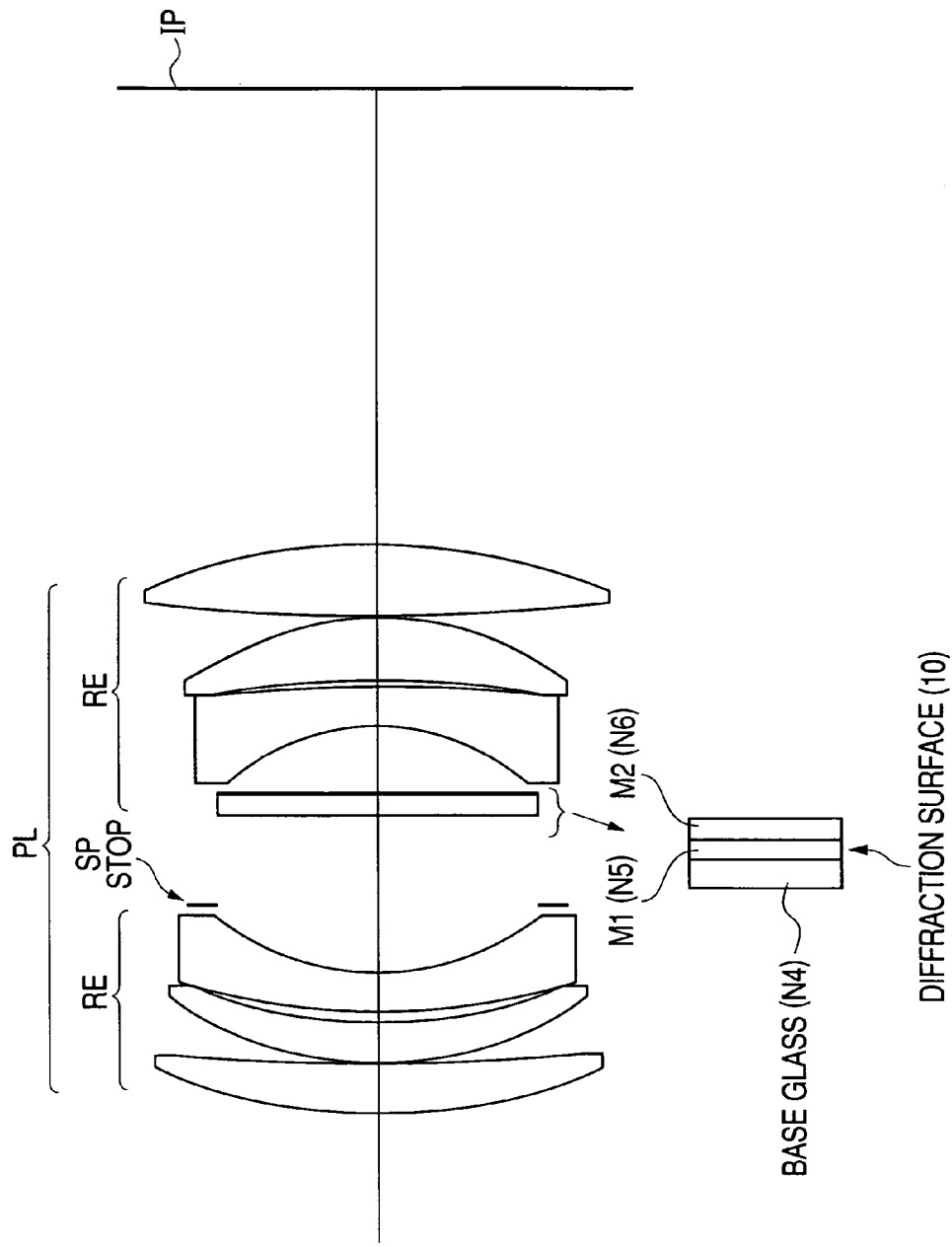
FIG. 10 is a cross sectional view of an optical system in a condition that aberrations are recorrected after removing an aspherical surface from the optical system in which the aberrations has been once corrected by means of the diffractive optical element according to the first embodiment.

FIG. 8 shows aberrations of the optical system in which the diffractive optical element according to numerical embodiment 1 is used to correct aberrations (in the state focused on infinity). FIG. 9 shows aberrations of an optical system obtained by simply removing the aspherical surface from the optical system in which the diffractive optical element according to numerical embodiment 1 is used to correct aberrations (in the state focused on infinity). FIG. 10 is a cross sectional view of the lens of an optical system obtained by removing the aspherical surface from the optical system in which the diffracted optical element according to numerical embodiment 1 is used to correct aberrations and correcting aberrations again only by the spherical system (numerical embodiment 2). FIG. 11 shows aberrations of the optical system according to numerical embodiment 2 (in the state focused on infinity).

As will be apparently seen from FIG. 8, in the optical system in which the diffractive optical element of the first embodiment is used, both of spherical aberration for the design wavelength (d-line) and chromatic spherical aberration are excellently corrected. Comparison of FIG. 8 and FIG. 9 shows that contribution of the aspherical surface ASPH to the spherical aberration is large. On the other hand, it will be understood from FIG. 11 that when correction of spherical aberration for the design wavelength (d-line) is implemented even in absence of aspherical surface ASPH, aberration can be corrected to an extent that presents no problem, though chromatic spherical aberration slightly remains as compared to the aberrations shown in FIG. 8.

As will be apparently seen from comparison of FIG. 8 and FIG. 11, when aberration correction is implemented by providing an aspherical surface in the diffractive optical element, aberrations are corrected very excellently.

Next, numerical data of numerical embodiments 1 and 2 will be presented. In the numerical embodiments, suffix i represents the sequential number of each optical surface counted from the object side, Ri represents the radius of curvature of the i-th optical surface (i-th surface), Di represents the distance between the i-th surface and (i+1)-th surface, Ni represents the refractive index of the i-th optical member for d-line, νi represents the Abbe number of the i-th optical member for d-line, f represents the focal length, Fno represents the F-number, and ω represents the half angle of view. Furthermore, letting k be the conic constant, letting B, C, D, E be the aspherical coefficients of fourth, sixth, eighth and tenth-order respectively, and letting x be the shift amount along the optical axis at height h with the vertex of the surface being the reference, the shape of the aspherical surface is represented by the following formula:

$$x = \frac{(1/R)h^2}{1 + \sqrt{\{1-(1+k)(h/R)^2\}}} + Bh^4 + Ch^6 + Dh^8 + Eh^{10}$$

where R is the paraxial radius of curvature. Incidentally, the expression "E-X" means "×10$^{-x}$".

Numerical embodiment 1 is directed to a case in which a diffractive optical element and an aspherical surface are used to correct aberrations.

Numerical embodiment 2 is directed to a case in which only a diffractive optical element is used to correct aberrations and no aspherical surface is used.

The phase shape φ of the diffraction surface of the diffractive optical element is represented by the following formula:

$$\phi(h, m) = (2\pi/m\lambda 0)(C_1 h^2 + C_2 h^4 + C_3 h^6 + \ldots)$$

where,
h: height in the direction perpendicular to the optical axis,
m: order of diffraction of the diffracted light,
λ0: design wavelength
$C_i$: phase factor (i=1, 2, 3 . . . ).

The refracting power φD of the diffraction surface for a certain wavelength λ and a certain order of diffraction m can be represented as follows using the phase factor $C_1$ of the lowest order:

$$\phi D(\lambda, m) = -2C_1 m\lambda/\lambda 0.$$

The design order m of each diffraction grating that constitutes a stack-type (layered, laminated) diffraction optical element is 1, and the design wavelength λ0 is the wavelength of d-line (587.56 nm).

TABLE 1

(Numerical embodiment 1)
f = 51.5  Fno = 1.46  2ω = 45.6°

| R1 | 47.8254 | D1 | 4.1220 | N1 | 1.885000 | ν1 | 41 |
|---|---|---|---|---|---|---|---|
| R2 | 175.5599 | D2 | 0.1000 | | 1.1 | | |
| R3 | 30.4441 | D3 | 3.3597 | N2 | 1.885000 | ν2 | 41 |
| R4 | 40.4512 | D4 | 0.9587 | | 1.1 | | |
| R5 | 59.2398 | D5 | 3.2000 | N3 | 1.665395 | ν3 | 31 |
| R6 | 22.0269 | D6 | 5.8382 | | 1.1 | | |
| R7 | ∞ | D7 | 6.5206 | | 1.1 | | |
| aperture | | | | | | | |
| R8 | ∞ | D8 | 1.8000 | N4 | 1.51633 | ν4 | 64 |
| R9 | ∞ | D9 | 0.1000 | N5 | 1.583060 | ν5 | 30 |
| R10 | ∞ | D10 | 0.1000 | N6 | 1.632460 | ν6 | 64 |
| R11 | ∞ | D11 | 5.4782 | | 1.1 | | |
| R12 | -19.1351 | D12 | 3.2000 | N7 | 1.800311 | ν7 | 24 |
| R13 | -230.4808 | D13 | 0.6166 | | 1.1 | | |
| R14 | -87.6665 | D14 | 5.2530 | N8 | 1.885000 | ν8 | 41 |
| R15 | -26.0442 | D15 | 0.1000 | | 1.1 | | |
| R16 | 150.1119 | D16 | 6.1531 | N9 | 1.885000 | ν9 | 41 |
| R17 | -51.7046 | | | | 1.1 | | |

R10: diffraction surface
R11: aspherical surface
R10: <<phase factor of diffraction surface>>

| C1 | C2 | C3 | C4 |
|---|---|---|---|
| -1.76760E-04 | 1.04600E-06 | -8.02750E-09 | 3.32970E-11 |

R11: <<aspherical coefficient>>

| B | C | D | E |
|---|---|---|---|

K = 0

| 1.28308E-06 | -3.86963E-09 | 5.04364E-11 | -4.87440E-13 |

TABLE 2

(Numerical embodiment 2)
f = 51.5  Fno = 1.46  2ω = 45.6°

| R1 | 49.9612 | D1 | 4.50510 | N1 | 1.885000 | ν1 | 41 |
|---|---|---|---|---|---|---|---|
| R2 | 193.6694 | D2 | 0.1000 | | | | |
| R3 | 30.7455 | D3 | 3.4070 | N2 | 1.885000 | ν2 | 41 |
| R4 | 41.8206 | D4 | 0.9330 | | | | |
| R5 | 61.2697 | D5 | 3.2000 | N3 | 1.665161 | ν3 | 31 |
| R6 | 22.0513 | D6 | 5.8597 | | | | |
| R7 | ∞ | D7 | 7.5342 | | | | |
| aperture | | | | | | | |
| R8 | ∞ | D8 | 1.8000 | N4 | 1.51633 | ν4 | 64 |
| R9 | ∞ | D9 | 0.1000 | N5 | 1.583060 | ν5 | 30 |
| R10 | ∞ | D10 | 0.1000 | N6 | 1.632460 | ν6 | 64 |
| R11 | ∞ | D11 | 5.3379 | | | | |
| R12 | -19.6033 | D12 | 3.2000 | N7 | 1.802666 | ν7 | 24 |
| R13 | -391.728 | D13 | 0.7219 | | | | |
| R14 | -96.0610 | D14 | 5.4779 | N8 | 1.885000 | ν8 | 41 |
| R15 | -26.8381 | D15 | 0.1000 | | | | |
| R16 | 142.5499 | D16 | 6.7413 | N9 | 1.885000 | ν9 | 41 |
| R17 | -50.801 | | | | | | |

R10: << phase factor >>
$C_1 = -5.3361 \times 10^4$
$C_2 = 1.5686 \times 10^{-6}$
$C_3 = -2.5562 \times 10^{-7}$
$C_4 = -2.13221 \times 0^{-11}$ This application claims priority from Japanese Patent Application No. 2003-401730 filed Dec. 1, 2003, which is hereby incorporated by reference herein.

What is claimed is:
1. An optical system comprising:
a refractive optical element; and
a diffractive optical element,
wherein a diffractive portion of said diffraction optical element corrects a chromatic aberration flare compo- nent of wavelengths other than a predetermined wavelength remaining in said refractive optical element by means of an aspherical component given by a grating pitch of a diffraction grating that constitutes said diffractive portion, and a refractive portion of said diffractive optical element has a shape so as to correct an aberration component as a composite of an aberration component of said predetermined wavelength of said diffractive optical element shifted by the aforementioned correction and an aberration component of said predetermined wavelength of said refractive optical element.

2. An optical system according to claim 1, wherein said diffractive optical element has a refractive portion having an aspherical surface shape.

3. An optical system according to claim 1 that satisfies the following conditional expression:

$$|(\lambda 0/2\pi) \cdot (\phi(Y) - \phi 0(Y))| < |(N'-N) \cdot (X(Y) - X0(Y))|;$$

and $Y \neq 0$, where, $\phi(Y)$: phase shape of the diffractive portion represented by the following polynomial expression:

$$\phi 0(Y) = (2\pi/\lambda 0)(C_1 Y^2 + C_2 Y^4 + C_3 Y^6 + \ldots),$$

$\phi 0(Y)$: phase shape corresponding to the optical power given by the diffractive portion represented by the following formula:

$$\phi 0(Y) = (2\pi/\lambda 0)C_1 Y^2,$$

Y: height along a direction perpendicular to the optical axis, $\lambda 0$: design wavelength, Ck: phase factor (k=1, 2, 3, . . . ), X(Y): said aspherical surface shape representing the shift amount in the optical axis direction with the reference at the vertex on the optical axis, at height Y along a direction perpendicular to the optical axis, X0(Y): a spherical surface shape having a curvature equal to the paraxial curvature of said aspherical surface shape, representing the shift amount in the optical axis direction with the reference at the vertex on the optical axis, at height Y along a direction perpendicular to the optical axis, N': the refractive index, at said predetermined wavelength, of the medium just after (with respect to the traveling direction of rays) said refractive of the aspherical surface shape, N: the refractive index, at said predetermined wavelength, of the medium just before (with respect to the traveling direction of rays) said refractive portion of the aspherical surface shape.

4. An optical system according to claim 1, wherein said diffractive optical element comprises a plurality of diffraction gratings including at least two materials, and the maximum optical path length difference of rays passing through the diffractive portion of said diffractive optical element is an integral multiple of a plurality of wavelengths.

5. A method of designing an optical system having a refractive optical element and a diffractive optical element comprising:

a first step to correct a chromatic aberration flare component of wavelengths other than a predetermined wavelength remaining in said refractive optical element by means of an aspherical component given by a grating pitch of a diffraction grating that constitutes a diffractive portion of said diffractive optical element; and a second step to correct an aberration component as a composite of an aberration component of said predetermined wavelength shifted by the correction of said first step and an aberration component of said predetermined wavelength of said refractive optical element by means of a refractive portion of said diffractive optical element.

* * * * *

UNITED STATES PATENT AND TRADEMARK OFFICE
CERTIFICATE OF CORRECTION

PATENT NO. : 7,006,290 B2  Page 1 of 1
APPLICATION NO. : 10/992733
DATED : February 28, 2006
INVENTOR(S) : Hideki Ogawa It is certified that error appears in the above-identified patent and that said Letters Patent is hereby corrected as shown below:

COLUMN 2
Line 59, "aberrations has" should read --aberrations have--.
Line 64, "aberrations has" should read --aberrations have--.

COLUMN 5
Line 40, "view point" should read --viewpoint--.

COLUMN 6
Line 2, "involves" should read --involve--.
Line 55, "bellow" should read --below--.

COLUMN 7
Line 25, "diffraction." should read --diffraction--.

COLUMN 8
Line 37, "allows" should read --allow--.
Line 65, "diffracted" should read --diffractive--.

COLUMN 11
Line 25, "Φ0(*Y*)" should read --Φ(Y)--.

COLUMN 12
Line 9, "refractive" should read --refractive portion--.

Signed and Sealed this

Nineteenth Day of September, 2006

JON W. DUDAS
*Director of the United States Patent and Trademark Office*